United States Patent [19]

Madey

[11] 4,142,119
[45] Feb. 27, 1979

[54] ROTARY ELECTRIC DEVICE

[75] Inventor: Jesse M. Madey, Hyattsville, Md.

[73] Assignee: The United States of America as represented by the Administrator of the National Aeronautics and Space Administration, Washington, D.C.

[21] Appl. No.: 779,871

[22] Filed: Mar. 21, 1977

[51] Int. Cl.$^2$ ............................................ H02K 37/00
[52] U.S. Cl. ...................................... 310/46; 310/82; 310/231
[58] Field of Search .................... 310/46, 82, 219, 238, 310/232, 231, 103, 102, 93, 95, 98, 96, 83, 81, 80

[56] References Cited

U.S. PATENT DOCUMENTS

| | | | |
|---|---|---|---|
| 271,502 | 1/1883 | Millar | 310/82 X |
| 2,378,668 | 6/1942 | Vickers | 310/46 |
| 2,378,669 | 6/1945 | Vickers | 310/82 |
| 2,413,805 | 1/1947 | Vickers | 310/82 |
| 2,454,359 | 11/1948 | Vickers | 310/82 |
| 2,547,165 | 4/1951 | Mladek | 310/82 UX |
| 2,703,370 | 3/1958 | Steensen | 310/82 |
| 2,857,536 | 10/1958 | Light | 310/82 |
| 3,334,253 | 8/1967 | Hill | 310/82 |
| 3,452,227 | 6/1969 | Welch | 310/82 |
| 3,539,846 | 11/1970 | Jewell | 310/46 |
| 3,558,944 | 1/1971 | Verge | 310/82 |
| 3,751,698 | 8/1973 | Walker | 310/231 X |
| 3,770,997 | 11/1973 | Presley | 310/82 |
| 3,786,287 | 1/1974 | Stein | 310/46 |
| 3,870,914 | 3/1975 | Walker | 310/219 |

*Primary Examiner*—Donovan F. Duggan
*Attorney, Agent, or Firm*—Robert D. Marchant; John R. Manning; John O. Tresansky

[57] ABSTRACT

An electric motor having a low speed shaft that rotates at a speed much slower than the speed of a high speed shaft comprises a stator having a cylindrical bore with a longitudinal axis and a rotor that carries the low speed shaft and rotates in the bore eccentrically about the axis so that there is contact and no magnetic gap between a relatively small portion of the rotor periphery and the periphery of the bore. A magnetic field, rotating at the speed of the high speed shaft, is applied to the periphery of the bore. The field has longitudinally extending magnetic field components of opposite polarity so that around approximately 180° of the bore the field extends in a first direction, while around the other 180° of the bore the field extends in the opposite direction. The rotor includes permanent magnet pole faces at opposite ends of the bore.

17 Claims, 7 Drawing Figures

ROTARY ELECTRIC DEVICE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to rotary electric devices and more particularly to a device that includes a rotor member that is positioned to rotate in, and about, an axis of a bore so that there is contact between a relatively small portion of the rotor and the periphery of the bore.

Numerous devices have been proposed and utilized to provide very high speed ratios, e.g., between 100 to 1 and 1000 to 1, between rotating shafts. Most of the prior art devices have been mechanical, employing many gear sets or step pulleys. In addition, low speed motors have been proposed for the same purpose. These prior art devices are physically large and relatively inefficient in transferring power from one shaft to another. Inefficiency occurs in the mechanical devices because of the considerable friction that exists between the large number of interacting moving parts. The electrical devices have also been relatively inefficient because they have utilized an air gap between a rotor and a rotating magnetic field. The air gap has a high magnetic reluctance to reduce the magnetic flux coupled to the rotor, resulting in a loss of energy.

SUMMARY OF THE INVENTION

In accordance with one aspect of the invention, an improved rotary electric device comprises a stator having a cylindrical bore member with a longitudinal axis. A rotor member is positioned to rotate in the bore about the axis so that there is contact between a relatively small portion of the rotor and the periphery of the bore. Preferably, both the bore and the rotor member are of circular cross section so that the rotor rotates eccentrically about the axis of the bore. A rotating magnetic field having field components extending longitudinally of the bore axis, is applied to the periphery of one of the members, preferably the periphery of the bore. A magnetic force exists between the contacting magnetic peripheries of the first member and the other member (preferably the rotor) to eccentrically drive the rotor about the periphery of the bore. Enhanced efficiency results because contact between the peripheries of the rotor and bore provides a low reluctance magnetic path having no air gap.

The other member includes longitudinally spaced permanent magnetic pole faces that are alternately attracted to and repulsed from different portions of the periphery of the first member as the magnetic field, containing oppositely polarized longitudinal components, rotates about the periphery of the first member. In the alternative, the rotating field is longitudinally polarized in a single direction and extends only partially around the first member and the other member has a high magnetic permeability, but is not permanently magnetized.

In a preferred application of the invention, wherein a large speed ratio exists between a high speed shaft and an output shaft, the magnetic field rotates in synchronism with the high speed shaft, and the rotor carries the low speed shaft. The synchronized rotating field is established by any well known commutating means, such as a commutating disc on the high speed shaft; the commutating disc causes opposite polarity currents to be alternately applied to brushes of electromagnets that are equispaced about the periphery of the bore. It is to be understood, however, that any other suitable commutating means such as, for example, a coded light opaque disc with a light source and detector or alternating currents, either AC or DC, minus the commutator, can be employed. An even number of electromagnets is provided so that the commutating means simultaneously applies currents of a first polarity to one half of the electromagnets while currents of the second polarity are simultaneously applied to the other half of the electromagnets. All of the electromagnets responsive to currents of one polarity are positioned around 180° of the periphery of the bore, while the electromagnets responsive to the currents of the other polarity are positioned around the remaining 180° of the bore periphery.

In one embodiment, the high speed shaft has a first section for carrying the commutating disc; this section is coaxial with the axis. The high speed shaft has a second section offset from the first section so it is concentric with the rotor and journalled to a bearing for the rotor. The rotor carries the low speed shaft so that the low speed shaft is coaxial with the second section of the high speed shaft, whereby the low speed shaft turns eccentrically about the axis of the bore.

A further feature of the invention is that the speed ratios of the shafts can be changed at will by varying the diameter of either the bore or the rotor. In one embodiment, wherein the bore diameter is varied, the bore and rotor have corresponding tapered surfaces extending along the direction of the longitudinal axis. To vary the relative diameters of the bore and rotor, the tapered surface of the bore is translated along the longitudinal axis. In a second embodiment, wherein the rotor diameter is changed, the stator is provided with a structure enabling the rotor to be easily removed from the bore and replaced with a rotor of a different diameter. To assure contact between the peripheries of the rotor and bore, a mass of resilient material is preferably provided between bearings carried by the second section of the first shaft and the rotor to urge the periphery of the rotor into engagement with the periphery of the bore. To provide additional speed change between the high speed shaft and a further shaft of the device, a spur gear, mounted on the low speed shaft, is connected to the further shaft, which is coaxial with the bore. The connection between the spur gear and further shaft is via another gear having internal teeth that are drivingly connected to teeth of the spur gear.

It is, accordingly, an object of the present invention to provide a new and improved highly efficient and small electrical device for establishing large speed ratios between shafts.

It is another object of the invention to provide a new and improved low speed, highly efficient and relatively compact rotary electric device.

It is a further object of the invention to provide a new and improved electric device for enabling a high speed ratio between shafts to be attained, wherein the ratio can be changed at will.

These and other objects and advantages of this invention will become apparent upon reading the following description of which the attached drawings form a part.

DESCRIPTION OF THE PREFERRED EMBODIMENT

Figure 1:
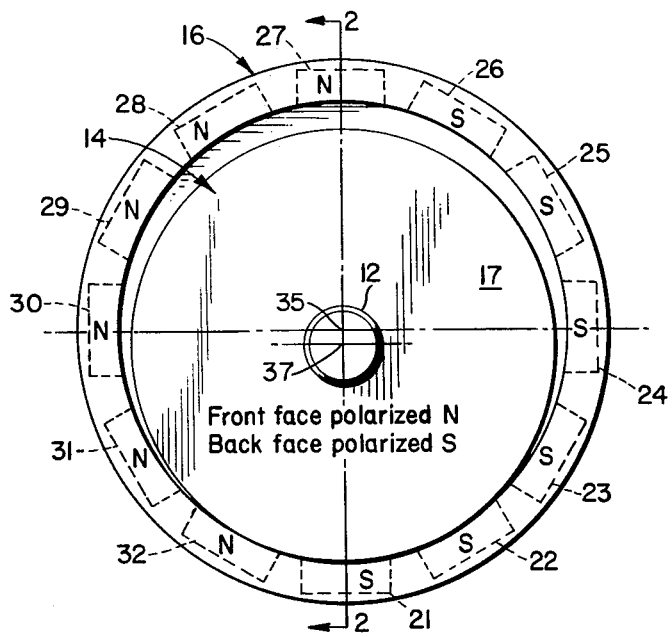
FIG. 1 is a front view of a preferred embodiment of a device in accordance with the present invention.
Figure 2:
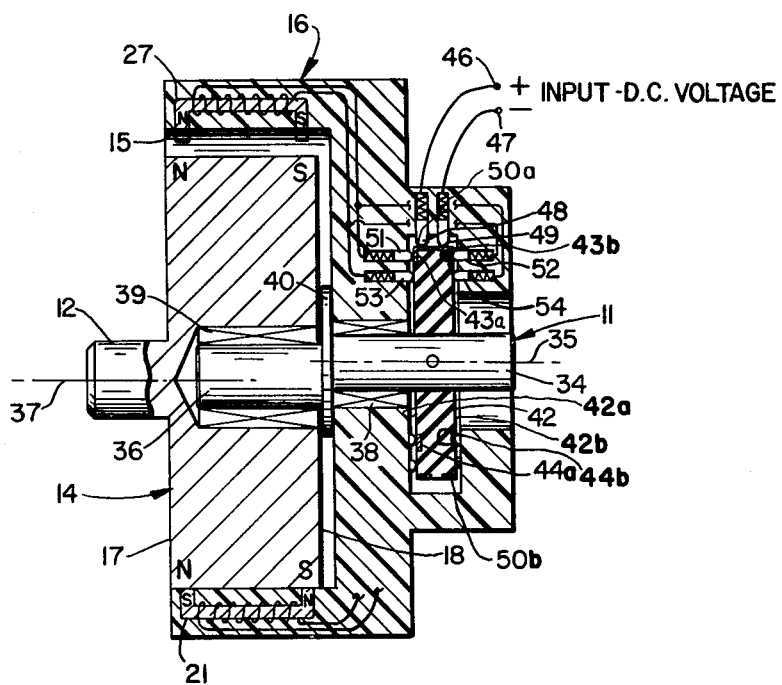
FIG. 2 is a side view, taken through the lines 2—2 of FIG. 1.

Reference is now made to FIGS. 1 and 2 of the drawings wherein there are illustrated central high speed shaft 11 and eccentric low speed shaft 12; shaft 11 is journalled in and shaft 12 is an integral part of cylindrical rotor 14 having a circular, peripheral wall. A portion of the wall of rotor 14 contacts the periphery of cylindrical circular bore 15 of stator 16. Bore 15 has an internal diameter slightly greater than the diameter of rotor 14 so that a gap exists between them and the rotor can roll on the inside of the bore. The diameters of rotor 14 and bore 15 determine the speed ratio between shafts 11 and 12 in accordance with:

$$D_{14}/(D_{15} - D_{14})$$

where:
$D_{15}$ = diameter of bore 15, and
$D_{14}$ = diameter of rotor 14.

Rotor 14 includes oppositely polarized permanent magnet pole faces 17 and 18 which are disposed longitudinally in bore 15 to interact with a rotating magnetic field derived from stator 16; it is assumed that faces 17 and 18 respectively have north and south poles.

Figure 3:
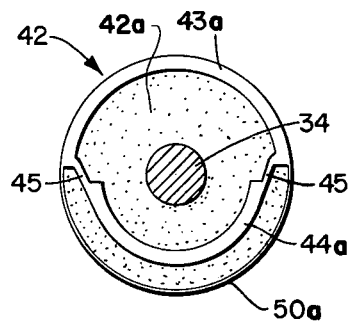
FIG. 3 is a plan view of a slip ring disc employed as part of a commutator in the device of FIG. 1.

The rotating magnetic field has oppositely directed components that extend longitudinally of bore 15 so that at any instant approximately one-half of the rotating magnetic field, through a continuous 180° arc, extends axially in one direction along bore 15, while the other half of the magnetic field extends in the opposite direction longitudinally of the bore through a continuous 180° arc. In the embodiment of FIGS. 1-3, the rotating magnetic field is established by twelve electromagnets 21-32 that are equispaced about the periphery of the stator 16. It should be understood, however, that any number of electromagnets can be used to produce the rotating magnetic field. Each of electromagnets 21-32 extends longitudinally of stator 16 and includes a core of high magnetic permeability, preferably fabricated of soft iron, on which is wound a separate coil. Pole faces of adjacent ones of electromagnets 21-32 are spaced from each other by the non-magnetic material forming the remainder of stator 16. Commutating current is supplied to the coils of electromagnets 21-32 by any suitable means such as, for example, a commutating disc (described infra), a photoelectric means including a coded light opaque disc or alternating currents. The coils of electromagnets 21-32 are wound so that the commutating currents flow longitudinally of stator 16 to establish the oppositely directed rotating magnetic field components.

In the situation illustrated in FIGS. 1-3, electromagnets 21-26 are activated so that they have a longitudinal polarization opposite from the polarization of faces 17 and 18; electromagnets 27-32 are activated so that they have the same polarization as faces 17 and 18. In response to electromagnets 21-32 being activated in this manner, the greatest attractive force exists between electromagnet 21 and the lowest portion of the peripheral surface of rotor 14, i.e., where the rotor and stator contact each other and there is no magnetic air gap and minimum magnetic reluctance exists. The greatest repulsive forces between rotor 14 and stator 16 exist in the gap along radii of rotor 14 passing through electromagnet 32, in the clockwise direction immediately next to electromagnet 21; the second greatest repulsive forces exist along radii of rotor 14 passing through electromagnet 31, in the clockwise direction, immediately next to electromagnet 32. As the arcuate distance from electromagnet 21 increases, there is an increasing distance between the peripheries of rotor 14 and stator 16, with a resulting increase in air gap between the peripheries of the rotor and stator, resulting in decreases in the attractive and repulsive forces between the peripheries of the stator and rotor.

As the magnetic field established by electromagnets 21-32 rotates so that different electromagnets are polarized in different directions, the periphery of rotor 14 rolls on a different portion of stator 16. For example, if it is assumed that electromagnets 22-27 are polarized so that south and north poles thereof are respectively established in proximity to faces 17 and 18, while electromagnets 21 and 28-32 are energized so that north and south poles are respectively established in proximity to faces 17 and 18, rotor 14 rolls so that the greatest contact exists along a radial line from the center of the rotor through electromagnet 22. Because the greatest attractive force between rotor 14 and stator 16 occurs at the contact region between the rotor and stator, where the magnetic reluctance of the magnetic circuit is a minimum, and where no magnetic air gap exists, the present motor is very efficient in transferring power from the electromagnets to the rotor. Efficiency can be increased by shaping the current supplied to the different electromagnets as rotor 14 comes in close proximity to the electromagnets. In particular, the current could be shaped so that maximum current is applied to the electromagnet in contact with rotor 14 and minimum or zero current is applied to the electromagnet farthest from rotor 14. The current supplied to the different electromagnets could progressively decrease from the maximum to the minimum level, or current could be supplied only to the electromagnet in contact with rotor 14 and the electromagnets closest to it.

As stated supra, the speed ratio between central high speed shaft 11 and eccentric, low speed shaft 12 is the diameter of rotor 14 to the difference between the diameter of bore 15 and rotor 14. In an exemplary case, the diameter of bore 15 is 3.000 inches, while the diameter of rotor 14 is 2.995 inches. In such an example, the speed ratio between shafts 11 and 12

$$(2.995/3.000 - 2.995) = 599$$

rpm for shaft 11 to one rpm for shaft 12. It is thus seen that a very large speed ratio is obtained, resulting in a very low output speed, with a highly efficient device occupying a very small volume.

Central high speed shaft 11 includes a first part 34, coaxial with axis 35 of stator 16, and a second part 36, coaxial with rotor 14 and eccentric shaft 12. Sections 34 and 36 are respectively seated in roller bearings 38 and 39, which in turn are seated against the periphery of bores in the stator 16 and rotor 14; these bores are respectively coaxial with axes 35 and 37. To minimize endplay of shaft 11, the shaft includes a flange 40 that extends transversely to axis 35 in a gap between face 18 of rotor 14 and an adjacent face of stator 16.

In the embodiment of FIGS. 1–3, the polarity of the commutating currents supplied to electromagnets 21–32 is controlled by a commutating disc 42 fixedly mounted on section 34 of shaft 11. Disc 42 is fabricated of an electrically insulating material; in register on the opposite faces of disc 42 are electrically conducting, metal, semi-circular segments 43 and 44 that are connected to each other by metal segments 45. Extending completely around the rim of disc 42, there are two spaced and electrically insulated metal rings 50, each ring abuts against a different face of disc 42 and is integral with the segment 43 on the abutting face. Conducting segments 43 and 44 are selectively connected to a DC power supply at terminals 46 and 47 by a pair of brushes 48 and 49 that selectively engage metal rings 50 on the rim of disc 42. The current flowing in the conducting segments of disc 42 is picked up by twelve sets of brushes equispaced about disc 42, so that one set of brushes is provided for each of electromagnets 21–32. Each set of brushes includes four brushes 51–54; brushes 51 and 52 have a first corresponding radial position on opposite sides of disc 42, while brushes 53 and 54 have a second corresponding radial position on the opposite sides of disc 42. The brushes and segments are arranged so that brushes 51 and 52 engage segments 43, while brushes 53 and 54 are positioned to engage segments 44. Brushes 51 and 54 are connected to each other and to the end of the winding of electromagnets 21–32 in closest proximity to face 17, while brushes 52 and 53 are connected to each other and to the other ends of the electromagnet windings. The brushes and conducting segments of disc 42 are arranged so that brushes 51 and 52 never engage conducting segments 43 while brushes 53 and 54 are engaging conducting segments 44, and vice versa.

In the situation illustrated, wherein brushes 51 and 52 engage segments 43, positive current is applied from terminal 46 through brush 48 through segment 43 on the left face of disc 42. This current flows from segment 43 through brush 51 to the ends of windings 27–32 adjacent face 17. The current flows through the windings of electromagnets 27–32 and thence to brushes 52 and segment 43 on the right side of disc 42. From segment 43, on the right side of disc 42, the current flows through brush 49 back to terminal 47. Simultaneously, segments 44 on the two faces of disc 42 are connected to brushes 53 and 54 so that positive current flows from terminal 46 through brush 48 to segment 44 on the left side of disc 42 and thence from brush 53 to the end of electromagnets 27–32 adjacent face 18. The current flows through the windings of electromagnets 27–32 and flows from the ends of the windings of electromagnets 27–32 adjacent face 17 back to brushes 54. From brushes 54, the current flows through segment 44 on the right side of disc 42 to brush 54 and thence to negative DC supply terminal 47.

As shaft section 34 rotates, disc 42 rotates to selectively supply the current from terminals 46 and 47 to the coils of electromagnets 21–32 so that at any instant of time, half of the electromagnets are responsive to current of one polarity while the other half of the electromagnets are responsive simultaneously to current of the opposite polarity. Because of the equal spacing of electromagnets 21–32 about the periphery of bore 15, all of the electromagnets responsive to currents of one polarity are positioned 180° around the bore periphery, while the electromagnets responsive to currents of the other polarity are positioned around the remaining 180° of the bore periphery.

Figure 4:
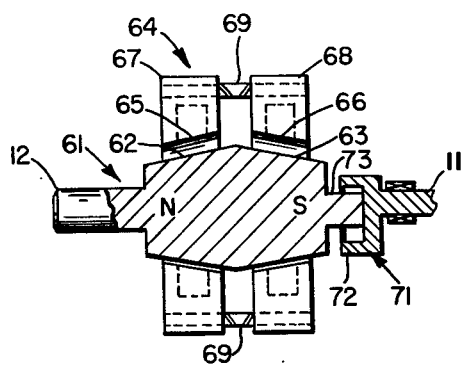
FIG. 4 is a side view of a portion of a modification of the invention, wherein the speed ratio of shafts connected to the device are changed at will.
Figure 5:
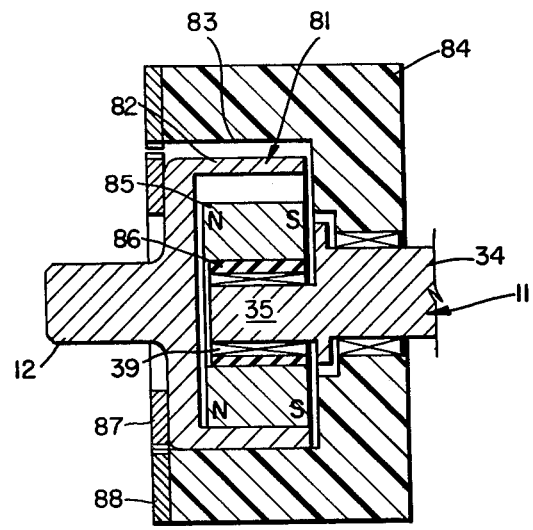
FIG. 5 is a side sectional view of another embodiment wherein the speed ratio of the shafts is changed at will by providing a rotor that is easily removed and replaced.

In accordance with another aspect of the invention, as illustrated in FIGS. 4 and 5, the ratio of center high speed shaft 11 to the eccentric low speed shaft 12 can be changed at will by varying the diameter of either the bore or the rotor. In the embodiment of FIG. 4, the diameter of the bore is varied, while in the embodiment of FIG. 5, the diameter of the rotor is varied. In FIGS. 4 and 5, the electromagnets and commutating circuitry are not shown to facilitate the drawing and description.

Referring more particularly to FIG. 4, rotor 61, on which eccentric low speed shaft 12 is integrally mounted coaxially with the center of the rotor, includes outwardly tapering sides 62 and 63. Stator 64 includes tapered interior surfaces 65 and 66 that respectively correspond with sides 62 and 63. In cross section, the tapers of surfaces 62 and 65 and surfaces 63 and 66 are the same, and in any particular cross section, these surfaces lie in parallel planes. Rotor 64 is divided into two segments 67 and 68 which respectively carry surfaces 65 and 66.

Segments 67 and 68 are translatable relative to each other to adjust the effective diameter of stator 64 relative to the fixed diameter of rotor 61, while providing a constant gap between surfaces 62 and 65 and 63 and 66, regardless of the spacing between segments 67 and 68. Lead screws 69 form one suitable means for varying the spacing between segments 67 and 68. With segments 67 and 68 adjusted so that they are in closest proximity to each other, so that the inner faces of segments 67 and 68 are in abutting relationship, the effective diameter of stator 64 is greatest, so that the speed ratio between shafts 11 and 12 is a maximum. In contrast, when segments 67 and 68 have maximum spacing between them, whereby the outer edges of segments 67 and 68 are aligned with the vertical walls of rotor 61, the diameter of stator 64 is effectively a minimum and a minimum speed ratio exists between shafts 11 and 12.

To provide eccentric turning of rotor 61 about the longitudinal axis of shaft 11 and stator 64, shaft 11 is provided with a slotted center that is formed as a cup 71 having an axis between the axis of shafts 11 and 12. Cup 71 includes a ring 72 having an inner diameter contacting the periphery of stub shaft 73 that extends from the side of rotor 61 opposite from shaft 12; stub shaft 73 has an axis coincident with the axis of shaft 12 and rotor 61.

Reference is now made to FIG. 5 of the drawings wherein there is illustrated a sectional view of an embodiment of the invention wherein the diameter of rotor 81 can be changed at will by easily removing one low speed shaft assembly and inserting another low speed shaft assembly in its place; the different output shaft assemblies have differing outer diameters. Rotor 81 includes low speed shaft 12 and a cylindrical ring 82 formed of a material having a high geometric permeability. A portion of the outer periphery of ring 82 contacts the interior wall 83 of a bore formed in stator 84; the bore has a center line coincident with the center line of shaft segment 34 of high speed shaft 11. Ring 82 is concentric with the axis of shaft 12 and segment 35 of shaft 11. Ring 85, having an inner diameter slightly greater than the outer diameter of bearings 39, carried by shaft segment 35, has opposite permanently magnetized longitudinal faces in the same manner that faces 17 and 18, in FIG. 2, are magnetized.

Tube 86 of resilient material, such as rubber, is wedged in the space between the inner periphery of ring 85 and the outer diameter of bearing 39 to urge the ring radially outwardly into contact with the inner wall of ring 82, the outer wall of which engages the interior periphery of bore 83. The outward, radial force exerted by tube 86 on ring 85 causes the ring and output shaft 12 to form an effectively unitary structure. To lock low speed shaft 12 to stator 84, and prevent rotational slippage of the low speed shaft, the shaft is provided with a ring 87 having external teeth that mesh with internal teeth of ring 88 that is formed on a face of housing 84.

If it is desired to change the speed ratio between shafts 11 and 12, shaft 12 is slid away from stator 84, along the longitudinal axis of the shaft, and a different shaft assembly is inserted in its place. The different shaft assembly has a ring 82 with an outer diameter different from the outer diameter of the ring on the previous shaft assembly. The radial thicknesses of both rings 82 are the same. Magnetic ring assembly 85 remains in situ while the different shaft assemblies are removed from and inserted into the bore of stator 84. Resilient tube 86 exerts sufficient radial force against ring 85 and the interior of ring 82 to enable the different diameter rings to be inserted.

Figure 6:
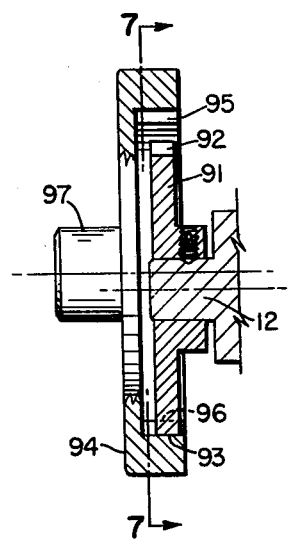
FIG. 6 is a partial side sectional view of a modification wherein a spur gear provides a further change in the speed ratio.
Figure 7:
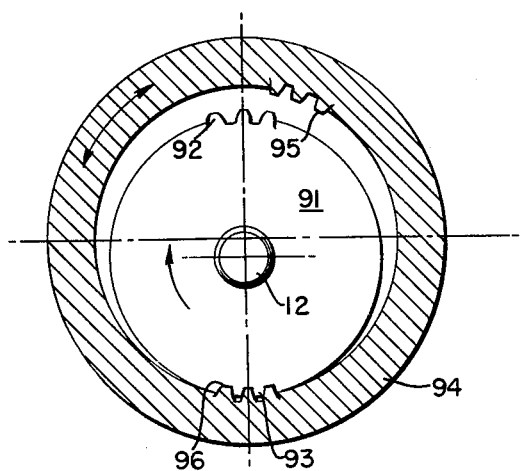
FIG. 7 is a sectional view, taken through the lines 7—7 of FIG. 6.

Additional variations in the rotational speed of a high speed shaft and a low speed shaft can be attained by employing a reduction gear assembly of the type illustrated in FIGS. 6 and 7. In the modification of FIGS. 6 and 7, a spur gear 91 is fixedly mounted on eccentric, low speed shaft 12. Spur gear 91 includes two sets of diametrically opposed teeth 92 and 93 that engage teeth on the interior of gear 94. The interior diameter of ring 94 exceeds the exterior diameter of spur gear 91 and gear 94 is mounted so that its axis is coincident with the axis of shaft 11 and stator 16 and gear 94 is eccentric relative to gear 91. Teeth 95 and 96 on the interior of gear 94 are not diametrically opposite from each other so that while teeth 93 and 96 engage each other, teeth 92 and 95 do not engage each other.

The speed reduction attained with the arrangement of FIGS. 6 and 7 occurs because low speed shaft 12 does not rotate about the center line of stator 16, but rotates eccentrically relative to housing 16 and the center line of gear 94. Stub shaft 97 having an axis coincident with the axis of stator 16 and an integral part of gear 94 can rotate in the same or opposite direction from shaft 11. Final rotational direction is determined by the ratio of the difference in diameter between spur gear 91 and gear 94 to the difference in diameter between rotor 14 and stator 16. If the difference between gears 91 and 94 is larger than the difference between rotor 14 and stator 16, the rotation is clockwise; if the difference is smaller, the rotation is counterclockwise; and if the differences are the same, there is no rotation.

While the preferred embodiment of the invention involves the use of a permanently magnetized rotor, it is to be understood that the principles of the invention are also applicable to a rotor fabricated of a high magnetic permeability material. In such a case, only one half of the electromagnets are energized at any one time, and these electromagnets are energized with a current of a single polarity. For example, current is supplied to electromagnets 21-26 while no current is supplied to electromagnets 27-32 when rotor 14 is in the position illustrated in FIG. 1. To cause rotor 14 to roll in a counterclockwise direction on the periphery of bore 15, the current supplied to the electromagnets is shifted so that electromagnets 22-27 are supplied with current while electromagnets 21 and 28-32 are deenergized. In this way, only attractive forces exist between the periphery of rotor 14 and the inner peripheral wall of stator 16, and no repulsive forces exist between these surfaces. Maximum attractive force exists where there is zero air gap between rotor 14 and stator 16, on the face of the electromagnet adjacent an electromagnet that is not energized.

While there have been described and illustrated several specific embodiments of the invention, it will be clear that variations in the details of the embodiments specifically illustrated and described may be made without departing from the true spirit and scope of the invention as defined in the appended claims. For example, the positions of the permanent magnet and electromagnets can be reversed so that an annular permanent magnet is on stator 16 and the electromagnets are on rotor 14.

What is claimed is:

1. A rotary electric device for establishing high speed ratios between a pair of rotating shafts comprising a stator having a cylindrical bore member with a longitudinal axis, a rotor member positioned to roll in the bore about the axis so that there is contact and no magnetic air gap between a relatively small portion of the rotor and the periphery of the bore, a high speed shaft, the high speed shaft having a first section rotatably coupled in the stator axially aligned with the axis and a second section offset from the first section and rotatably coupled in the rotor member, a low speed shaft coupled to the rotor in coaxial alignment with the second section of the high speed shaft for providing eccentric turning of the low speed shaft, means for applying a rotating magnetic field to the periphery of one of the members, said field having a longitudinally extending magnetic field component, the other of said members including longitudinally spaced magnetic pole faces that are alternately attracted to different portions of the periphery of the one member as the magnetic field rotates about the periphery of the one member.

2. The device of claim 1 wherein the rotating field has oppositely directed, longitudinally extending field components and the longitudinally spaced pole faces of the other member are permanently magnetized, whereby the other member is alternately attracted to and repulsed from different portions of the periphery of the one member.

3. The device of claim 1 wherein the rotor and bore have circular cross sections of differing diameters so that the rotor rotates eccentrically about the axis.

4. The device of claim 3 wherein the means for applying the rotating field includes means for synchronizing the field rotation with the high speed shaft rotation, whereby the speed ratio between the high speed shaft and the low speed shaft equals the diameter of the rotor member of the difference in diameters of the bore and rotor members.

5. The device of claim 4 further including means for effectively varying the diameter of a first of the members.

6. The device of claim 5 wherein the first member is the bore member.

7. The device of claim 6 wherein the bore and rotor members having corresponding tapered surfaces extending along the axis, and means for translating a tapered surface of the bore member in the direction of the axis to control the relative diameters of the tapered surfaces of the bore and rotor members.

8. The device of claim 5 wherein the first member is the rotor.

9. The device of claim 8 wherein the stator member includes means for enabling the rotor to be removed from the bore means.

10. The device of claim 9 wherein the rotor member includes a longitudinally extending circular rim of magnetic material, pole faces of the rotor element being contained on a cylindrical member contacting only a relatively small portion of an interior face of the rim and having a circular cross section with a diameter less than the inner diameter of the rim.

11. The device of claim 1 further including a spur gear mounted on the low speed shaft, another shaft coaxial with the bore member having an internal gear drivingly connected to the spur gear.

12. The device of claim 1 further including resilient means for urging the periphery of the rotor member into engagement with the periphery of the bore member.

13. The device of claim 12 wherein the second section is journalled to a bearing for the rotor member, said urging means including a mass of resilient material between the bearing and the rotor member.

14. The device of claim 1 wherein the rotating magnetic field is applied to the stator member and the rotor member has a constant polarity magnetic field.

15. The device of claim 14 wherein the rotor member includes oppositely polarized permanent magnet pole faces adjacent opposite ends of the bore member, the bore member including an even number (N) of electromagnets equispaced about the periphery of the bore member, said means for applying including means for applying currents of a first polarity to N/2 of the electromagnets positioned approximately around 180° of the periphery of the bore member and for applying currents of a second polarity to the other N/2 electromagnets positioned approximately around the other 180° of the periphery of the bore member, said electromagnets being positioned so that opposite pole faces thereof are adjacent opposite ends of the bore member.

16. The device of claim 15 wherein the means for applying includes: four contact brushes for each of the electromagnets, a commutating disc mounted on the first section of the high speed shaft for alternately applying opposite polarity currents to the four brushes of each electromagnet.

17. The device of claim 16 wherein the commutating disc includes two opposed faces, a pair of diametrically opposed electrically interconnected semicircular electrical conductors of different diameters on each of the faces to form an electrical slip ring, the conductors on the opposed two faces being in register, a first pair of said brushes for each electromagnet being positioned to contact the conductors of one diameter on the two opposed faces, a second pair of said brushes for each electromagnet being positioned to contact the conductors of the second diameter on the two opposed faces.

* * * * *